United States Patent
Shin et al.

(10) Patent No.: US 12,518,673 B2
(45) Date of Patent: Jan. 6, 2026

(54) DISPLAY DEVICE AND CONTROL METHOD THEREFOR HAVING LOW GRAYSCALE MODE AND HIGH GRAYSCALE MODE

(71) Applicant: SAMSUNG ELECTRONICS CO., LTD., Suwon-si (KR)

(72) Inventors: Seungyong Shin, Suwon-si (KR); Jonghoon Jung, Suwon-si (KR); Changhoon Kim, Suwon-si (KR); Yongmin Jung, Suwon-si (KR); Jungmo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/392,768

(22) Filed: Dec. 21, 2023

(65) Prior Publication Data
US 2024/0144857 A1 May 2, 2024

Related U.S. Application Data

(63) Continuation of application No. PCT/KR2022/011347, filed on Aug. 2, 2022.

(30) Foreign Application Priority Data

Aug. 27, 2021 (KR) .................. 10-2021-0113636

(51) Int. Cl.
G09G 3/20 (2006.01)
G09G 3/32 (2016.01)

(52) U.S. Cl.
CPC ......... G09G 3/2096 (2013.01); G09G 3/2007 (2013.01); G09G 3/32 (2013.01);
(Continued)

(58) Field of Classification Search
CPC .. G09G 3/3607; G09G 3/2003; G09G 3/2007; G09G 3/3233; G09G 3/3258;
(Continued)

(56) References Cited

U.S. PATENT DOCUMENTS 8,427,514 B2 4/2013 Miura
9,691,353 B2 6/2017 Joo et al.
(Continued)

FOREIGN PATENT DOCUMENTS

JP 2011-237496 A 11/2011
JP 2019102184 A * 6/2019 ........... G09G 3/2096
(Continued)

OTHER PUBLICATIONS

Communication dated Nov. 18, 2022, issued by the International Searching Authority in counterpart International Application No. PCT/KR2022/011347 (PCT/ISA/210).
(Continued)

Primary Examiner — Kwang-Su Yang
(74) Attorney, Agent, or Firm — Sughrue Mion, PLLC

(57) ABSTRACT

A display device includes: a display panel; a light emitting unit; a driving circuit configured to control a driving current applied to the light emitting unit based on image data; and a controller configured to: obtain a selected mode of one of a low grayscale mode or a high grayscale mode based on a required luminance included in the image data, obtain a minimum value and a maximum value of the driving current based on the selected mode, based on an output range of the driving current being adjusted to obtain an adjusted output range, increase a number of luminance levels expressible within the adjusted output range to obtain an increased number of luminance levels, and control the driving circuit based on the increased number of luminance levels.

14 Claims, 12 Drawing Sheets

(52) U.S. Cl.
CPC ............... *G09G 2320/0233* (2013.01); *G09G 2320/0633* (2013.01); *G09G 2320/064* (2013.01); *G09G 2330/021* (2013.01)

(58) Field of Classification Search
CPC ......... G09G 3/3614; G09G 2310/0286; G09G 2310/08; G09G 2320/0242; G09G 2320/0276
See application file for complete search history.

(56) References Cited

U.S. PATENT DOCUMENTS

| | | | |
|---|---|---|---|
| 10,789,900 | B2 | 9/2020 | Kim et al. |
| 11,748,855 | B2 | 9/2023 | Park et al. |
| 2008/0278432 | A1 | 11/2008 | Ohshima |
| 2015/0003749 | A1 | 1/2015 | Kim et al. |
| 2015/0364089 | A1* | 12/2015 | Pyo ................ G09G 3/3258 345/77 |
| 2016/0027365 | A1* | 1/2016 | Kempf ............. G09G 3/2003 345/690 |
| 2018/0040301 | A1 | 2/2018 | Bae et al. |
| 2019/0180702 | A1 | 6/2019 | Kim et al. |
| 2020/0184889 | A1 | 6/2020 | Jang et al. |
| 2022/0270562 | A1 | 8/2022 | Jung et al. |

FOREIGN PATENT DOCUMENTS

| | | |
|---|---|---|
| KR | 10-2013-0057909 A | 6/2013 |
| KR | 10-2016-0042195 A | 4/2016 |
| KR | 10-2016-0095673 A | 8/2016 |
| KR | 10-2016-0101572 A | 8/2016 |
| KR | 10-2017-0053204 A | 5/2017 |
| KR | 10-1761253 B1 | 7/2017 |
| KR | 10-2019-0069668 A | 6/2019 |
| KR | 10-2019-0109197 A | 9/2019 |
| KR | 10-2020-0088696 A | 7/2020 |
| KR | 10-2021-0057417 A | 5/2021 |

OTHER PUBLICATIONS

Communication dated Nov. 18, 2022, issued by the International Searching Authority in counterpart International Application No. PCT/KR2022/011347 (PCT/ISA/237).

European Extended Search Report issued Aug. 19, 2024 by the European Patent Office for EP Patent Application No. 22861577.9.

Communication issued Jan. 20, 2025 by the Korean Intellectual Property Office in Korean Patent Application No. 10-2021-0113636.

Office Action dated Sep. 1, 2025, issued by Korean Patent Office in Korean Patent Application No. 10-2021-0113636.

* cited by examiner

DISPLAY DEVICE AND CONTROL METHOD THEREFOR HAVING LOW GRAYSCALE MODE AND HIGH GRAYSCALE MODE

CROSS-REFERENCE TO RELATED APPLICATIONS

This application is a Bypass Continuation Application of International Application No. PCT/KR2022/011347, filed on Aug. 2, 2022, which is based on and claims priority to Korean Patent Application No. 10-2021-0113636, filed on Aug. 27, 2021, in the Korean Intellectual Property Office, the disclosure of which are incorporated by reference herein in their entireties.

BACKGROUND

1. Field

The disclosure relates to a display device including a backlight unit and a liquid crystal panel.

2. Related Art

In general, a display device includes a backlight unit and a liquid crystal panel, and controls the amount of light from the backlight unit that transmits the liquid crystal panel, thereby converting electrical information into visual information and displaying the visual information.

Recently produced display devices may provide excellent quality images with rich color and high contrast by applying a High Dynamic Range (HDR). The HDR may enable more realistic images through a wider range of brightness from dark to light.

SUMMARY

One aspect of the disclosure is directed to providing a High Dynamic Range (HDR) image with improved luminance in a low grayscale or a high grayscale.

According to an aspect of the disclosure, a display device may include: a display panel; a light emitting unit including a plurality of Light Emitting Diodes (LEDs); a driving circuit configured to control a driving current applied to the light emitting unit based on image data; and a controller. The controller may be configured to: obtain a selected mode of one of a low grayscale mode or a high grayscale mode based on a required luminance included in the image data, obtain a minimum value and a maximum value of the driving current based on the selected mode, based on an output range of the driving current being adjusted to obtain an adjusted output range, increase a number of luminance levels expressible within the adjusted output range to obtain an increased number of luminance levels, and control the driving circuit based on the increased number of luminance levels.

The controller may be configured to increase a number of grayscale levels that fall within the output range to correspond to the increased number of luminance levels.

The controller may be configured to: obtain the minimum value of the driving current based on a minimum value of the required luminance, and obtain the maximum value of the driving current based on a maximum value of the required luminance.

The controller may be configured to increase the number of grayscale levels from a first level number to a third level number, in response to the low grayscale mode being the selected mode.

The controller may be configured to increase the number of grayscale levels from a second level number to the third level number, in response to the high grayscale mode being the selected mode.

The controller may be configured to: obtain the minimum value of the driving current and the maximum value of the driving current based on the required luminance included in the image data, and obtain the output range based on the minimum value of the driving current and the maximum value of the driving current.

The light emitting unit may be configured to be driven in one of the low grayscale mode or the high grayscale mode in which the output range of the driving current is reduced.

The controller may be configured to adjust the output range of the driving current in units of frames of the image data.

The controller may be configured to control a luminance of the light emitting unit using at least one of a Pulse Amplitude Modulation (PAM) control or a Pulse Width Modulation (PWM) control.

According to an aspect of the disclosure is a control method of a display device including a display panel, a light emitting unit including a plurality of Light Emitting Diodes (LEDs), a driving circuit configured to control a driving current applied to the light emitting unit based on image data. The control method may include: obtaining a selected mode of one of a low grayscale mode or a high grayscale mode based on a required luminance included in the image data, obtaining a minimum value and a maximum value of the driving current according to the selected mode, and adjusting an output range of the driving current to obtain an adjusted output range, increasing a number of luminance levels expressible within the adjusted output range to obtain an increased number of luminance levels, and controlling the driving circuit based on the increased number of luminance levels.

The increasing of the number of luminance levels expressible may include increasing a number of grayscale levels that fall within the output range to correspond to the increased number of luminance levels.

The obtaining of the minimum value of the driving current and the maximum value of the driving current may include: obtaining the minimum value of the driving current based on a minimum value of the required luminance, and obtaining the maximum value of the driving current based on a maximum value of the required luminance.

The increasing of the number of grayscale levels may include increasing the number of grayscale levels from a first level number to a third level number, in response to the low grayscale mode being the selected mode.

The increasing of the number of grayscale levels may include increasing the number of grayscale levels from a second level number to the third level number, in response to the high grayscale mode being the selected mode.

The method may include: obtaining the minimum value of the driving current and the maximum value of the driving current based on the required luminance included in the image data, and obtaining the output range based on the minimum value of the driving current and the maximum value of the driving current.

The plurality of LEDs may be configured to be driven in one of the low grayscale mode or the high grayscale mode in which the output range of the driving current is reduced.

The adjusting of the output range of the driving current may be performed in units of frames of the image data.

The method may further include controlling a luminance of the plurality of LEDs using at least one of a Pulse Amplitude Modulation (PAM) control or a Pulse Width Modulation (PWM) control.

According to an aspect of the disclosure, a High Dynamic Range (HDR) image with improved image quality may be provided by using the increased number of grayscale levels and the increased number of luminance levels in a low grayscale mode or high grayscale mode.

DETAILED DESCRIPTION

Figure 1:
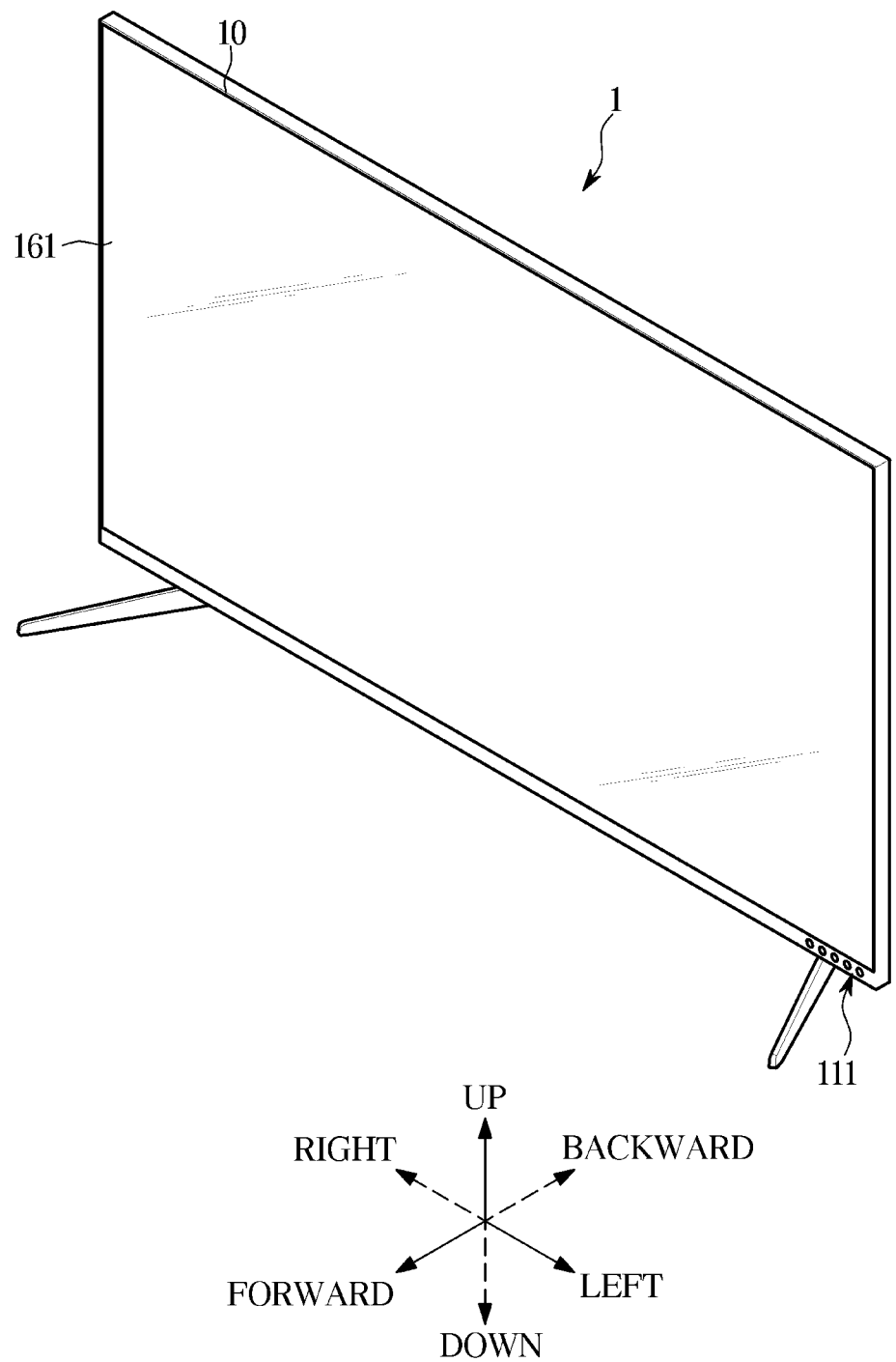
FIG. 1 is an exterior view of a display device according to an embodiment of the disclosure.

Like reference numerals refer to like elements throughout the specification. Terms used herein are only for the purpose of describing particular embodiments and are not intended to limit to the disclosure. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

Throughout the specification, it will be understood that when an element is referred to as being "connected" another element, it may be directly or indirectly connected to the other element, wherein the indirect connection includes connection via a wireless communication network.

In addition, when a part "includes" or "comprises" an element, unless the context clearly indicates otherwise, the part may further include other elements, not excluding the other elements.

Throughout the specification, when a member is "on" another member, this includes not only when the member is in contact with the other member, but also when there is another member between the two members.

It will be understood that, although the terms first, second, third, etc., may be used herein to describe various elements, but elements are not limited by these terms. It is to be understood that the singular forms include plural forms as well, unless the context clearly dictates otherwise.

The singular form is intended to include the plural form as well, unless the context clearly indicates otherwise.

Reference numerals used for method steps are just used for convenience of explanation, but not to limit an order of the steps. Thus, unless the context clearly dictates otherwise, the written order may be practiced otherwise.

Figure 2:
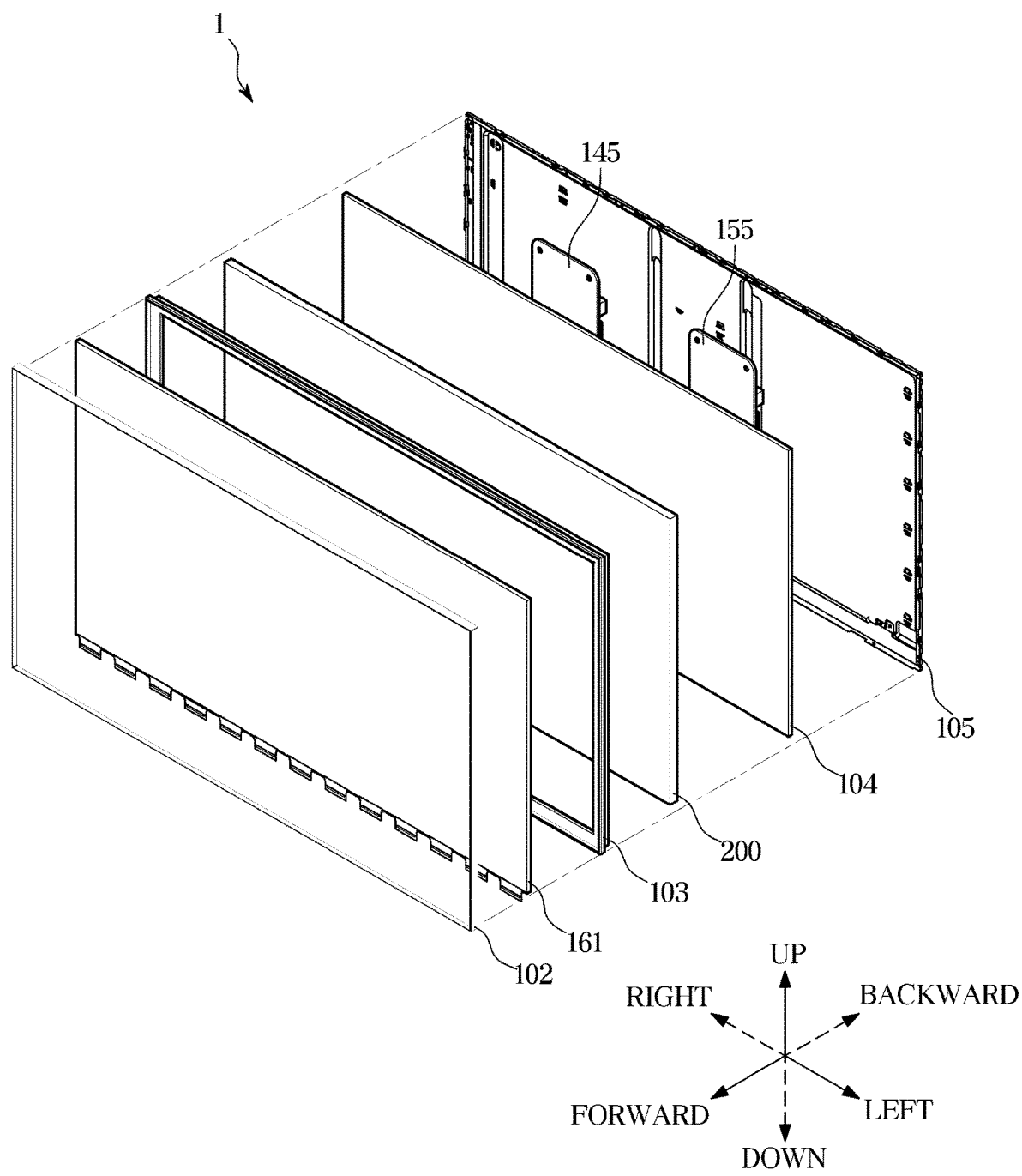
FIG. 2 is an exploded view of a display device according to an embodiment of the disclosure.
Figure 3:
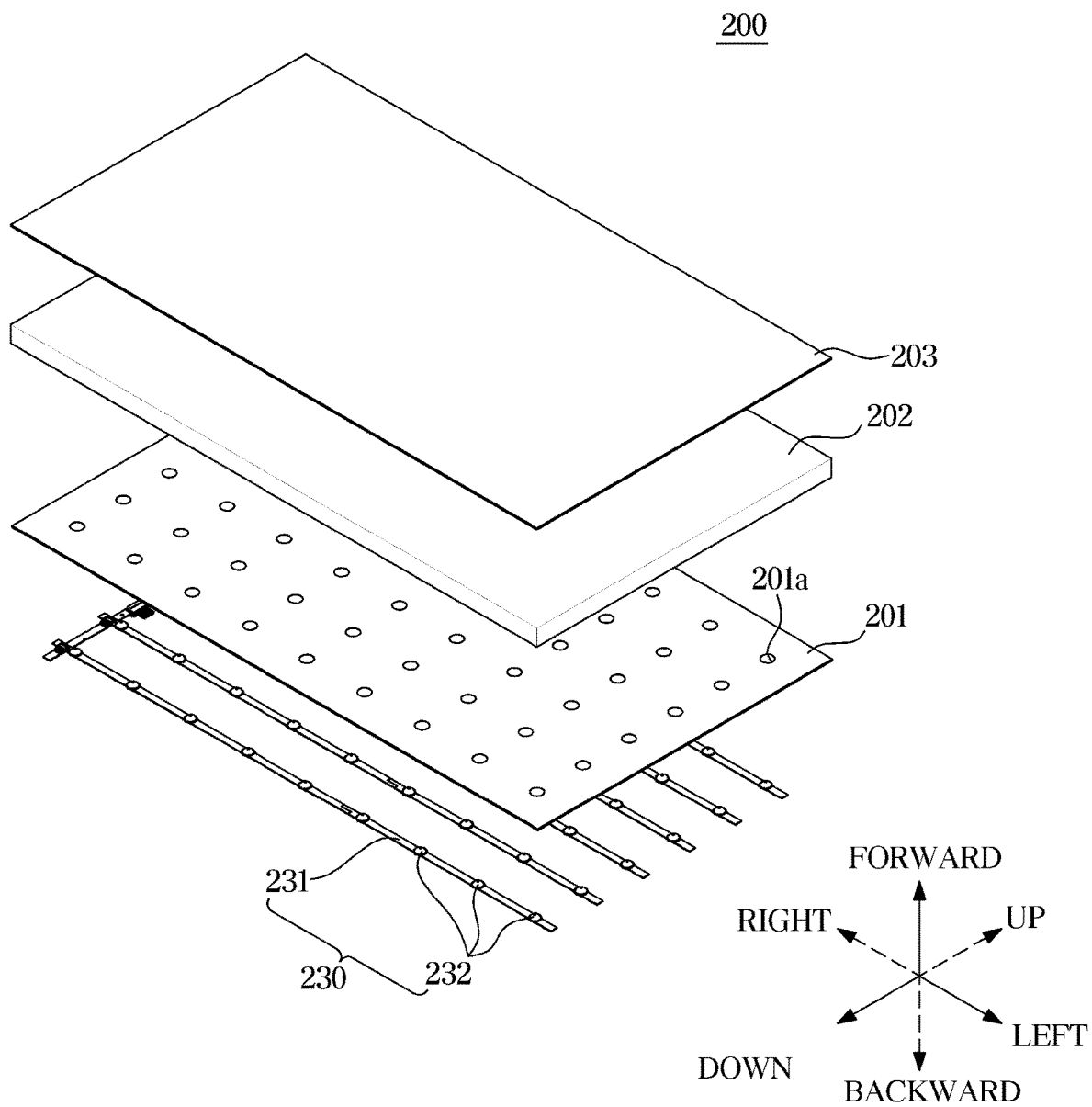
FIG. 3 is an exploded view of a backlight unit according to an embodiment of the disclosure.

FIG. 1 is an exterior view of a display device according to an embodiment of the disclosure. FIG. 2 is an exploded view of a display device according to an embodiment of the disclosure. FIG. 3 is an exploded view of a backlight unit according to an embodiment of the disclosure.

Referring to FIG. 1, a display device 1 according to an embodiment is a device capable of processing image data received from the outside and visually displaying a processed image.

As shown in FIG. 1, the display device 1 may be implemented as a television (TV), but embodiments of the display device 1 are not limited thereto. For example, the display device 1 may be implemented as a monitor of a computer, or may be included in a navigation terminal device or various portable terminal devices. Here, the portable terminal devices may include a laptop computer, a smartphone, a tablet Personal Computer (PC), a Personal Digital Assistant (PDA), and the like.

The display device 1 includes a main body 10 forming an exterior and accommodating or supporting components of the display device 1, and a liquid crystal panel 161 displaying an image.

The main body 10 may be provided with an input button 111 for receiving a user command regarding a power on/off, a volume control, a channel control, switching of a screen mode, and the like. In addition to the input button 111 provided in the main body 10, a remote controller may be provided to receive a user command related to control of the display device 1.

In addition, various components for displaying an image on the liquid crystal panel 161 may be provided in the main body 10.

For example, as shown in FIG. 2, the main body 10 includes a backlight unit 200 emitting surface light forward, the liquid crystal panel 161 blocking or transmitting light emitted from the backlight unit 200, a power supply assembly 145 supplying power to the backlight unit 200 and the liquid crystal panel 161, and a control assembly 155 controlling operations of the backlight unit 200 and the liquid crystal panel 161.

In addition, the main body 10 includes a bezel 102, a frame middle mold 103, a bottom chassis 104, and a rear cover 105. The bezel 102, the frame middle mold 103, the bottom chassis 104, and the rear cover 105 fixes and supports the power supply assembly 145, the control assembly 155, the liquid crystal panel 161 and the backlight unit 200.

In general, the liquid crystal panel 161 displays image data by applying a grayscale voltage to a liquid crystal layer provided with a liquid crystal material having an anisotropic dielectric constant and injected between two substrates and adjusting the amount of light transmitted through the substrate.

Meanwhile, the liquid crystal panel 161 may include pixels. Here, a pixel is a minimum unit constituting a screen displayed through the liquid crystal panel 161, and is also referred to as a dot. Hereinafter, for convenience of description, it is collectively referred to as a pixel.

Each pixel may receive an electrical signal representing image data and output an optical signal corresponding to the received electrical signal. As such, optical signals output from a plurality of pixels included in the liquid crystal panel 161 are combined to display the image data on the liquid crystal panel 161.

In this instance, a pixel electrode is provided in each pixel and each pixel is connected to a gate line and a source line. The gate line and the source line may be configured by methods known to those skilled in the art, and a detailed description thereof is omitted herein.

In addition, because the liquid crystal panel 161 may not emit light by itself, as described above, the display device 1 may be provided with the backlight unit 200 projecting backlight to the liquid crystal panel 161.

Accordingly, the display device 1 may adjust a transmittance of the backlight passing through the liquid crystal layer by adjusting an intensity of a grayscale voltage applied to the liquid crystal layer of the liquid crystal panel 161, thereby displaying desired image data.

The backlight unit 200 may be implemented as a direct type or an edge type, and may be implemented in various forms known to those skilled in the art. Hereinafter, the backlight unit 200 implemented as a direct type is exemplified. However, embodiments of the disclosure are not limited thereto, and the backlight unit 200 may be implemented in various known forms.

As shown in FIG. 3, the backlight unit 200 may include a light emitting element array 230 generating light, a reflector sheet 201 reflecting light, a diffuser plate 202 dispersing light, and an optical sheet 203 improving luminance of light.

The backlight unit 200 according to an embodiment may be driven in one of a low grayscale mode or a high grayscale mode. The backlight unit 200 may be switched from the low grayscale mode to the high grayscale mode or from the high grayscale mode to the low grayscale mode under control of a controller 150. The backlight unit 200 may be driven by a driving current in which an output range is reduced in the low grayscale mode or the high grayscale mode.

The light emitting element array 230 is provided at a rearmost part of the backlight unit 200 and may include a plurality of sub blocks 232. The sub block 232 may include at least one light emitting element that generates light, and each of the sub blocks 232 may include a separate driving circuit. The plurality of sub blocks 232 may be arranged parallel to each other to face the liquid crystal panel 161 and may emit light forward.

In addition, the light emitting element array 230 may include a support 231 supporting and fixing the plurality of sub blocks 232.

The plurality of sub blocks 232 may be mounted in a predetermined arrangement to have uniform luminance. For example, the plurality of sub blocks 232 may be mounted on the support 231 at equal intervals. The arrangement of the plurality of sub blocks 232 on the support 231 may vary.

In this instance, the support 231 may supply power to the plurality of sub blocks 232. That is, current may be applied and power may be supplied to the light emitting element included in each of the plurality of sub blocks 232 through the support 231. The support 412 may be made of synthetic resin including a conductive power supply line for supplying power to the plurality of sub blocks 232 or may be configured as a Printed Circuit Board (PCB).

The light emitting element included in each of the plurality of sub blocks 232 may be one of a Light Emitting Diode (LED), an Organic Light Emitting Diode (OLED), or a Quantum Dot-Organic Light Emitting Diode (QD-OLED) capable of self-emitting based on a supplied current. However, a type of light emitting element is not limited thereto, and any element emitting light according to current may be included in the light emitting element.

The reflector sheet 201 may be provided in front of the light emitting element array 230, and may reflect light traveling behind the backlight unit 200 forward.

A through hole 201a corresponding to the sub block 232 may be formed in the reflector sheet 201. The light emitting element of the sub block 232 may pass through the through hole 201a and protrude forward of the reflector sheet 201. Because the light emitting element of the sub block 232 emits light in various directions in front of the reflector sheet 201, a portion of the light emitted from the light emitting element may travel backward. A reflective film included in the reflector sheet 201 may reflect light emitted backward from the light emitting element forward.

The diffuser plate 204 may be provided in front of the light emitting element array 230 and the reflector sheet 201, and may uniformly disperse the light emitted from the light emitting element of the light emitting element array 230.

The light emitting element may be located everywhere on a rear surface of the backlight unit 200. Even though the plurality of light emitting elements are equidistantly arranged on the rear surface of the backlight unit 200, differences in luminance may occur depending on the positions of the plurality of light emitting elements. To eliminate the differences in luminance due to the light emitting elements, the diffuser plate 204 may diffuse the light emitted from the light emitting elements within the diffuser plate 204. As such, the diffuser plate 204 may uniformly emit light incident from the light emitting element array 230 to the front surface.

The diffuser plate 204 may be made of polymethyl methacrylate (PMMA) or polycarbonate (PC) to which a diffusion agent for light diffusion is added.

The optical sheet 203 may include various sheets for improving luminance and luminance uniformity. For example, the optical sheet 203 may include a diffusion sheet, a first prism sheet, a second prism sheet, a reflective polarizing sheet, and the like.

In addition, according to embodiments, the backlight unit 200 may further include a quantum dot film that may change the color of light emitted from the light emitting element. In this case, the quantum dot film may be provided between the diffuser plate 202 and the optical sheet 203. The backlight unit 200 may include various sheets according to embodiments.

Meanwhile, according to the disclosure, although an element for light emission of the display device 1 is described as the backlight unit 200, the display device 1 may include a plurality of LEDs emitting light on a transparent substrate in addition to the backlight unit 200. A light emitting unit of the display device 1 may be one of the backlight unit 200 or a plurality of LEDs. The plurality of LEDs may include monochromatic LED elements, or may be polychromatic by including multi-color LED elements such as yellow LED elements, green LED elements, and/or blue LED elements. In this instance, each of the plurality of LEDs may be connected to an electrode by a signal line, and may include a driving current that controls the driving current based on image data.

A physical structure of the display device 1 has been described above. Hereinafter, each component of the display device 1 is described in detail, and controlling the backlight unit 200 to support one of low luminance or high luminance is briefly described.

Figure 4:
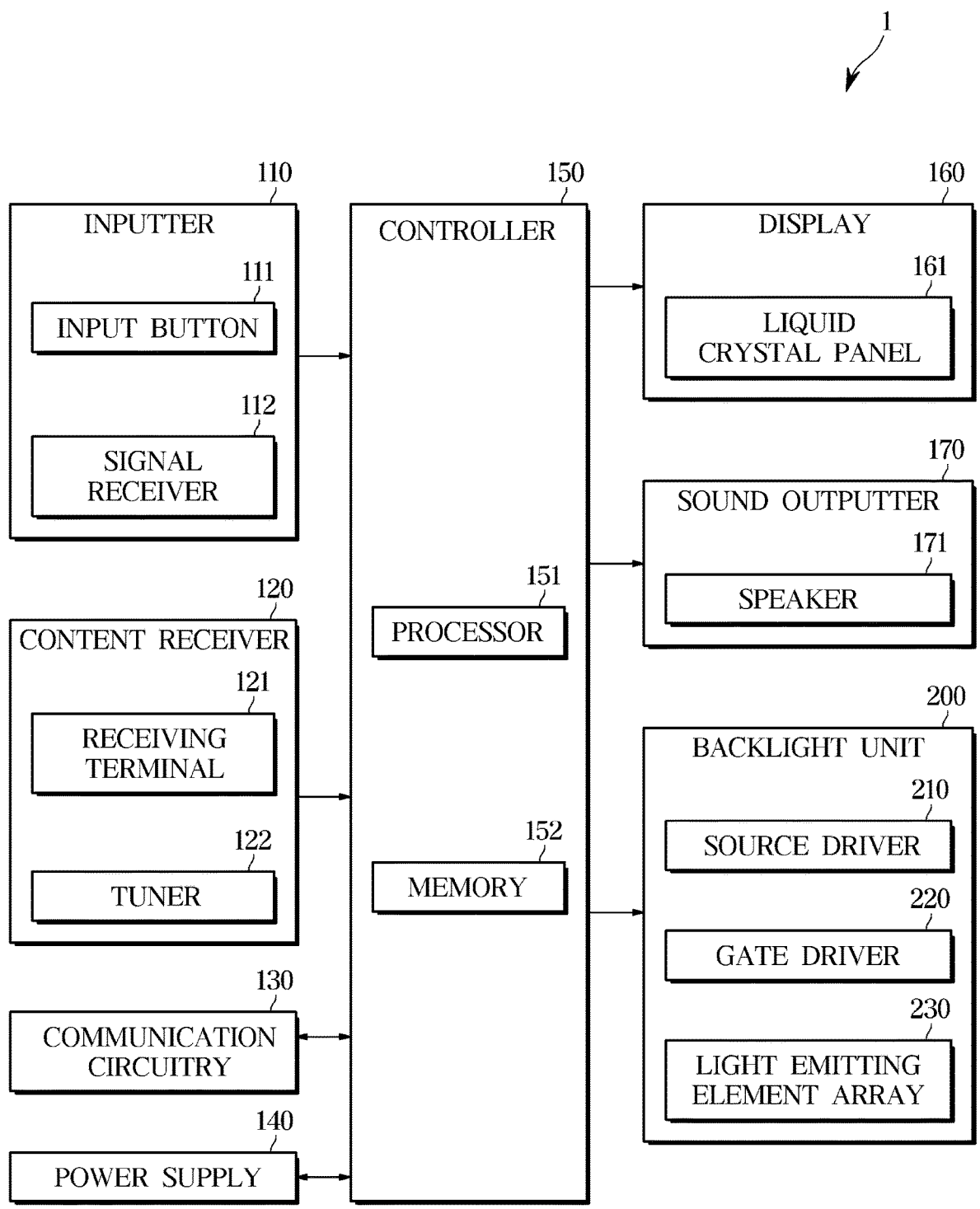
FIG. 4 is a control block diagram of a display device according to an embodiment of the disclosure.
Figure 5:
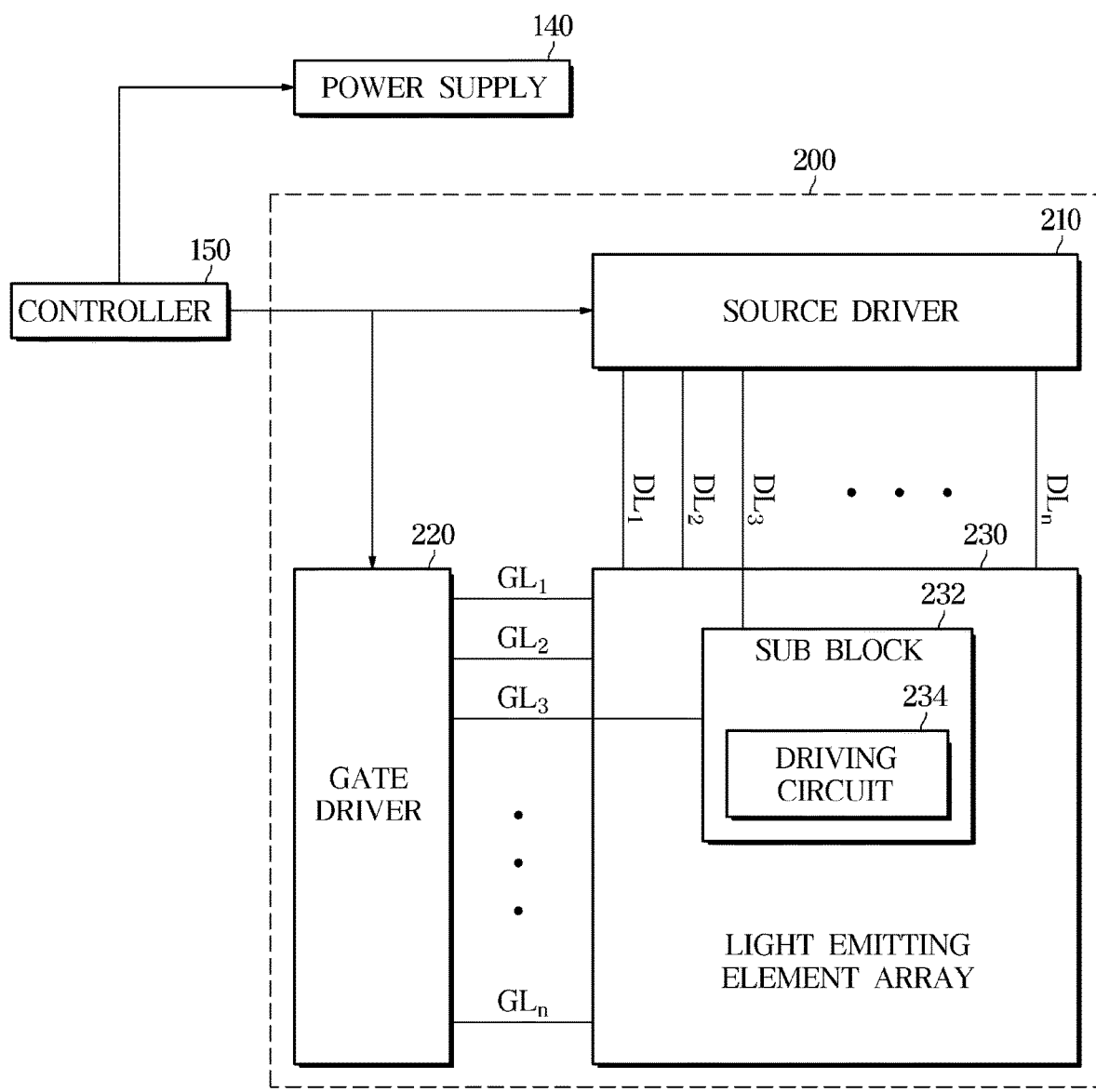
FIG. 5 is a diagram illustrating a control block diagram of a backlight unit according to an embodiment of the disclosure in more detail.

FIG. 4 is a control block diagram of a display device according to an embodiment of the disclosure. FIG. 5 is a diagram illustrating a control block diagram of a backlight unit according to an embodiment of the disclosure in more detail.

Referring to FIG. 4, the display device 1 according to an embodiment includes an inputter 110 receiving various control commands from a user, a content receiver 120 receiving content including images and sounds from an external device, a communication circuitry 130 transmitting and receiving various data such as content via a communication network, a power supply 140 supplying power to each component of the display device 1, a controller 150 processing the content received from the outside and controlling each component to output an image and sound corresponding to the content, a display 160 including the liquid crystal panel 161 to display an image corresponding to the content, a sound outputter 170 outputting a sound corresponding to the content, and the backlight unit 200 supplying backlight. However, according to embodiments, the display device 1 may omit some of the above-described components.

The inputter 110 may receive various control commands from a user.

For example, as shown in FIG. 4, the inputter 110 may include an input button 111. The input button 111 according to an embodiment may include a power button for turning on/off power of the display device 1, a channel button for changing a channel received by the content receiver 120, a volume button for adjusting a volume of sound output from the sound outputter 170, and the like.

Meanwhile, various buttons included in the input button 111 may employ a push switch and a membrane switch that detect a user's pressure, a touch switch that detects contact with a part of the user's body, or the like. However, the buttons included in the input button 111 are not limited thereto, and the input button 111 may employ various input means that may output an electrical signal to the controller 150 in response to a specific user's action.

In addition, the inputter 110 according to an embodiment may include a signal receiver 112 receiving a remote control signal from a remote controller.

In this instance, the remote controller obtaining a user input may be provided separately from the display device 1, obtain the user input, and transmit a wireless signal corresponding to the user input to the display device 1.

The signal receiver 112 may receive the wireless signal from the remote controller and output an electrical signal corresponding to a user input to the controller 150.

In addition, the inputter 110 may include various known components that may receive a control command from the user without any limitation. Furthermore, in a case where the liquid crystal panel 161 is implemented as a touch screen type, the liquid crystal panel 161 may perform a function of the inputter 110.

The content receiver 120 may include a receiving terminal 121 and a tuner 122 that receive content including image data and/or a sound signal from content sources.

The image data includes luminance data, and a luminance required by the plurality of sub blocks 232 may be transmitted to the controller 150 to identify whether the image data is a low grayscale or a high grayscale. Specifically, the controller 150 may identify whether the image data is a low grayscale or a high grayscale based on a maximum brightness that may be produced in a specific mode, thereby determining an output range of a driving circuit 234 (FIG. 5).

The receiving terminal 121 may include a Radio Frequency (RF) coaxial cable connector that receives a broadcast signal including content from an antenna, a High Definition Multimedia Interface (HDMI) that receives content from a set-top box or a multimedia playback device, a component video connector, a composite video connector, a D-sub connector, and the like.

The tuner 122 may receive a broadcast signal from a broadcast reception antenna or a wired cable, and may extract a broadcast signal of a channel selected by a user from among broadcast signals. For example, the tuner 122 may pass a broadcast signal having a frequency corresponding to the channel selected by the user among a plurality of broadcast signals received through the broadcast reception antenna or wired cable, and may block a broadcast signal having a different frequency.

As described above, the content receiver 120 may receive the image data and audio signal from the content sources through the receiving terminal 121 and/or the tuner 122, and may output the image data and/or audio signal to the controller 150.

The communication circuitry 130 may receive various contents through wireless or wired communication. To this end, the communication circuitry 130 may include a wireless communication module supporting a wireless communication method and a wired communication module supporting a wired communication method.

For example, the wireless communication may include a cellular communication using at least one of 5th generation (5G), Long Term Evolution (LTE), LTE advance (LTE-A), Code Division Multiple Access (CDMA), Wideband CDMA (WCDMA), Universal Mobile Telecommunications System (UMTS), Wireless broadband (WiBro), or Global System for Mobile communications (GSM). According to an embodiment, for example, the wireless communication may include at least one of Wireless Fidelity (WiFi), Bluetooth, Bluetooth Low Energy (BLE), zigbee, Near Field Communication (NFC), magnetic secure transmission, Radio Frequency (RF), or Body Area Network (BAN). According to an embodiment, the wireless communication may include a Global Navigation Satellite System (GNSS).

In addition, the wired communication method may include a Peripheral Component Interconnect (PCI), PCI-express, and Universe Serial Bus (USB), without being limited thereto.

The power supply 140 may supply power to each component of the display device 1.

For example, the power supply 140 may supply power to the display 160. Specifically, the power supply 140 may supply a driving voltage of each of a source driver and a gate driver of the display 160, and may supply a common voltage Vcom required for the liquid crystal layer of the liquid crystal panel 161 through each pixel electrode.

In addition, the power supply 140 may supply power to the backlight unit 200. Specifically, the power supply 140 may supply a driving voltage to each of a source driver 210 and a gate driver 220 of the backlight unit 200, and may also transfer a voltage to the light emitting element array 230. The power supply to the backlight unit 200 is described in detail later.

To this end, the power supply 140 may include a DC/DC converter Pulse Amplitude Modulation (PAM) driver or a Pulse Width Modulation (PWM) driver, and according to embodiments, the power supply 140 may be provided in a form of separate Integrated Circuit (IC), and correspond to the power supply assembly 145.

According to an embodiment, the controller 150 may include at least one memory 152 storing programs for performing the above-described operations and operations to be described below, and at least one processor 151 executing the stored programs, and may correspond to the control assembly 155.

The processor 151 according to an embodiment may process the content received through the content receiver 120 or the communication circuitry 130 and obtain image data corresponding to the content.

In addition, the processor 151 according to an embodiment may control the display 160 and the backlight unit 200 to display a corresponding image based on the image data.

The processor 151 according to an embodiment may determine a luminance corresponding to each of the plurality of sub blocks 232 included in the backlight unit 200 based on the image data. That is, the processor 151 may determine the luminance required for each of the sub blocks 232 based on the image data. The processor 151 may determine a minimum value and a maximum value of an output range of the driving current output from the driving circuit 234 based on luminance data for a frame. In response to the output range being determined, the driving circuit 234 may provide a driving current required for positions for each frame.

The processor 151 may determine a grayscale corresponding to each pixel of the liquid crystal panel 161 based on the image data, and may determine a luminance for the sub block 232 corresponding respectively to each pixel of the liquid crystal panel 161 based on the determined grayscale.

In other words, the sub blocks 232 of the backlight unit 200, which emit light to pixels requiring a low grayscale, are determined to require low luminance, and the sub blocks 232 of the backlight unit 200, which emit light to pixels requiring a high grayscale, are determined to require high luminance.

The determination of luminance for each of the plurality of sub blocks 232 of the backlight unit 200 may be performed frame-by-frame.

The processor 151 may determine a driving current (source voltage) corresponding to a corresponding sub block 232 to allow each of the sub blocks 232 to emit light with the required luminance.

The memory 152 may store information about a correlation between luminance and driving current.

In addition, the memory 152 may store information about a correlation between grayscale level and luminance. For example, in a case where the number of grayscale levels for the display device 1 to express luminance is 1024, the memory 152 may distinguish and store luminance levels. Accordingly, the processor 151 may control each of the sub blocks 232 to emit light with a luminance corresponding to the grayscale level.

As described above, to store various information, the memory 152 may be implemented as at least one of a non-volatile memory such as a cache, a Read Only Memory (ROM), a Programmable Read Only Memory (PROM), an Erasable Programmable Read Only Memory (EPROM), and an Electrically Erasable Programmable Read Only Memory (EEPROM), or a volatile memory such as a Random Access Memory (RAM). However, the memory 152 is not limited thereto, and any type capable of storing various information may be used as the memory 152.

The display 160 according to an embodiment may display an image by receiving the image data from the controller 150 and driving the liquid crystal panel 161 based on the input image data.

To this end, the display 160 includes a source driver, a gate driver, and a timing controller that transmits a gate control signal and a source control signal and controls overall operations of the source driver and the gate driver.

In addition, the display 160 includes a plurality of gate lines transmitting gate signals, a plurality of source lines that intersect the gate lines and transmit grayscale voltages, and the liquid crystal panel 161 formed in an area surrounded by the gate lines and source lines and including a plurality of pixel electrodes in a matrix form connected through switching elements that act as a switch between the gate lines and the source lines.

According to embodiments, the switching element may be a Thin Film Transistor (TFT), and may be implemented with various elements known to those skilled in the art.

In this instance, each of the pixels rotates a liquid crystal of the liquid crystal layer by an electric field between a pixel electrode to which the grayscale voltage is applied through the thin film transistor and a common electrode to which the common voltage Vcom is applied, thereby adjusting the amount of light transmission, and displaying an image.

The sound outputter 170 may receive sound data of the content received through the content receiver 120 or the communication circuitry 130 under the control of the processor 151 and may output sound. In this instance, the sound outputter 170 may include one or more speakers 171 converting an electrical signal into an acoustic signal.

The backlight unit 200 includes the light emitting element array 230 emitting light to the liquid crystal panel 161, the source driver 210 supplying a source voltage to the light emitting element array 230, and the gate driver 220 supplying a gate signal to the light emitting element array 230.

In addition, according to embodiments, the backlight unit 200 may include a timing controller controlling a timing of the source driver 210 and the gate driver 220. According to embodiments, the timing controller and the controller 150 may be provided as a single IC, or may be provided as separate ICs. Hereinafter, the controller 150 also performing a function of the timing controller is described.

As shown in FIG. 5, the backlight unit 200 includes a plurality of gate lines $GL_1$, $GL_2$, $GL_3$ ... $GL_m$ transmitting gate signals, a plurality of source lines $DL_1$, $DL_2$, $DL_3$ ... $DL_n$ that intersect the gate lines $GL_1$, $GL_2$, $GL_3$ ... $GL_m$ and transmit source voltages, and the light emitting element array 230 formed in an area surrounded by the gate lines $GL_1$, $GL_2$, $GL_3$ ... $GL_m$ and the source lines $DL_1$, $DL_2$, $DL_3$ ... $DL_n$ and including a plurality of sub blocks 232 in a matrix form connected through switching elements that act as a switch between the gate lines $GL_1$, $GL_2$, $GL_3$ ... $GL_m$ and the source lines $DL_1$, $DL_2$, $DL_3$ ... $DL_n$.

That is, the light emitting element array 230 may include the plurality of sub blocks 232 each connected to a single gate line and a single source line, and each of the plurality of sub blocks 232 may include the driving circuit 234 supplying a driving current to a light emitting element based on the gate signal and source voltage.

The source driver 210 according to an embodiment may set an output timing, a magnitude and polarity of a source voltage according to the source control signal and image data received from the controller 150, and may output an appropriate source voltage through the source lines $DL_1$, $DL_2$, $DL_3$ ... $DL_n$ according to a supply timing.

That is, the source driver 210 may supply a source voltage corresponding to a luminance required by each of the sub blocks 232 to a corresponding sub block 232 through a corresponding source line under the control of the controller 150.

In other words, the source driver 210 may convert luminance data corresponding to the image data received from the controller 150 into an analog source voltage based on the driving voltage supplied from the power supply 140, and may apply to each of the source lines $DL_1, DL_2, DL_3 \ldots DL_n$ arranged on the light emitting element array 230.

The source driver 210 may include at least one source driver IC, and the number of source driver ICs may be determined according to a size, resolution, and the like of the light emitting element array 230.

The gate driver 220 may be connected to one end or both ends of the gate lines $GL_1, GL_2, GL_3 \ldots GL_m$, and may generate gate signals using gate control signals provided from the controller 150 and gate on/off voltages supplied from the power supply 140. The gate signals may be applied to the gate lines $GL_1, GL_2, GL_3 \ldots GL_m$ arranged on the light emitting element array 230.

The gate driver 220 may include at least one gate driver IC, and the gate driver IC may be determined according to a size, resolution, and the like of the light emitting element array 230.

That is, the gate driver IC of the gate driver 220 may receive the gate control signal and sequentially apply on/off voltages, i.e., on/off signals, through the gate lines. Accordingly, the gate driver IC may sequentially turn on/off the switching elements connected to the gate lines.

As a result, the luminance data to be displayed in the sub blocks 232 connected to the gate lines may be converted into a source voltage divided into a plurality of voltages, and may be applied to each of the source lines. In this instance, a gate signal may be sequentially applied to all the gate lines during one frame period, and a source voltage corresponding to the luminance data may be applied to all the rows of the sub blocks 232, and thus the light emitting element array 230 may provide backlight corresponding to a single frame to the liquid crystal panel 161.

The light emitting element array 230 may include a plurality of light emitting elements arranged in a matrix form.

The light emitting element array 230 may include the plurality of sub blocks 232, each of which includes and controls at least one light emitting element.

In this instance, each of the sub blocks 232 may include the driving circuit 234, and the driving circuit 234 may be connected to a single gate line and a single source line and may receive a gate signal, source voltage, and peak voltage, thereby controlling the connected light emitting element. Hereinafter, a circuit configuration of the sub block 232 is described in detail.

Figure 6:
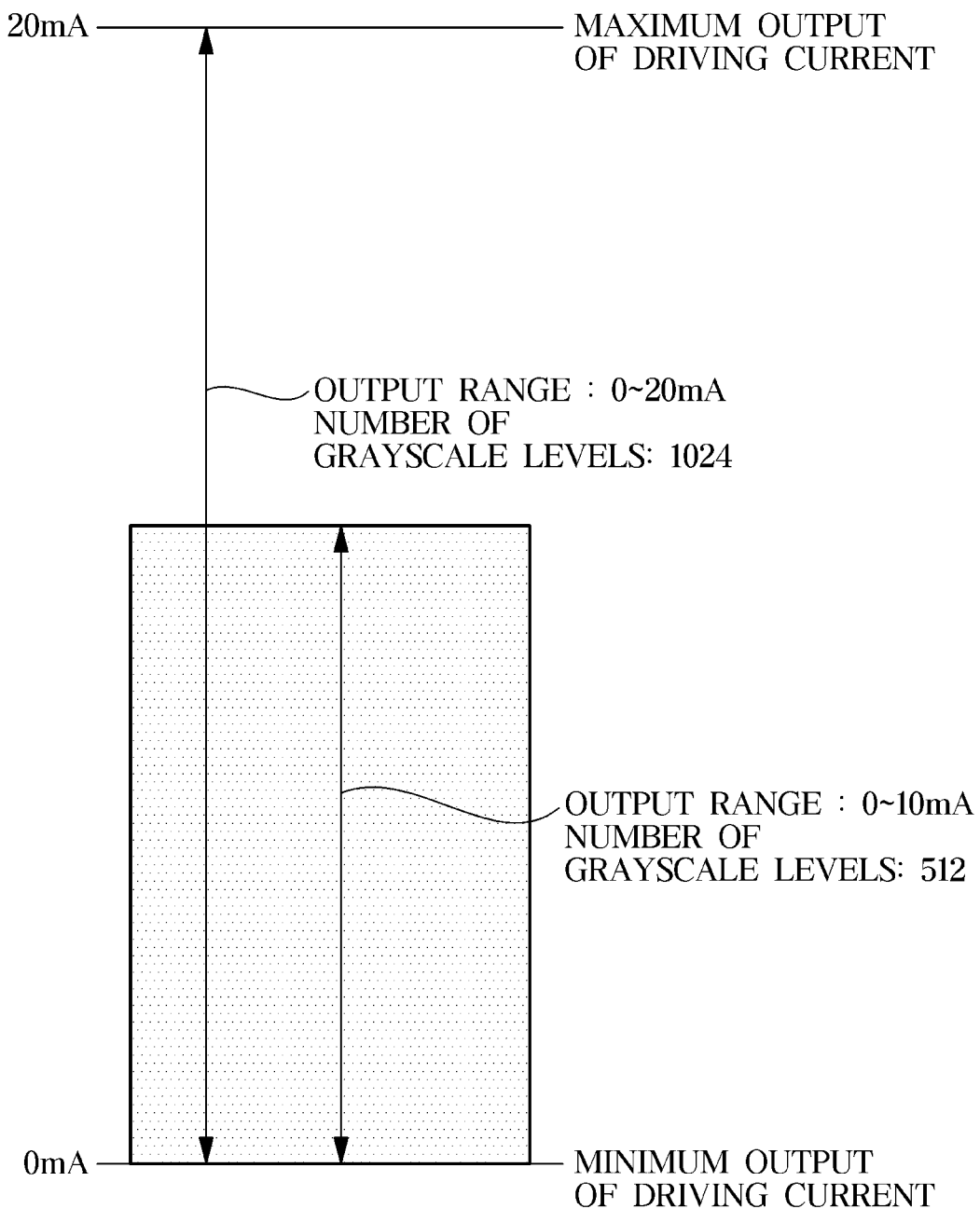
FIG. 6 and FIG. 7 are diagrams illustrating the number of grayscale levels and an output range of a driving current that are limited in a low grayscale or high grayscale.

As shown in FIG. 6, a single sub block 232 includes the driving circuit 234 and at least one light emitting element 236.

A first switching element included in the driving circuit 234 may adjust the amount of current transmitted to the light emitting element based on a source voltage corresponding to a required luminance to allow the light emitting element to emit light with the required luminance.

The switching element may receive an amount of charge corresponding to the source voltage from a capacitor C through a gate terminal.

A second switching element may receive the gate signal through the gate line, and upon receiving the gate signal, the source voltage may be supplied through a drain terminal to charge the capacitor C.

According to embodiments, the first switching element and the second switching element may be a Thin Film Transistor (TFT), and may be implemented with various elements known to those skilled in the art.

As described above, the controller 150 may determine a luminance required by each of the plurality of sub blocks 232 based on the image data, and determine a source voltage required by each of the sub blocks 232 based on the determined luminance. Thereafter, the controller 150 may control the source driver 210 and the gate driver 220 to supply a corresponding source voltage to each of the sub blocks 232. In this instance, the controller 150 may control the power supply 140 to supply power required to the source driver 210, the gate driver 220, and the light emitting element array 230.

Each of the components of the display device 1 has been described above. Hereinafter, a luminance control, a relationship between luminance and grayscale level, and the like, of the display device 1 of the disclosure are described.

The display device 1 according to an embodiment may provide an image of excellent quality with rich color and high contrast by applying High Dynamic Range (HDR). In this instance, the display device 1 may increase luminance than usual to improve visibility in a location (e.g., outdoors). To increase luminance, the display device 1 may use a PWM control method, but a PAM control method that increases a magnitude of current in a temporal limit for representing an instantaneous frame is advantageous. Accordingly, the display device 1 inevitably increases power consumption. In this case, the display device 1 may use both the PAM control method and the PWM control method, but may also use only either the PAM control method or the PWM control method.

To increase visibility outdoors, the display device 1 may distinguish an output range of driving current of the driving circuit 234 by dividing a first mode (low grayscale mode) which is low luminance and a second mode (high grayscale mode) which is high luminance. Here, the second mode corresponds to a mode in which a minimum brightness (minimum luminance) is increased to improve outdoor visibility, which will be described in greater detail with reference to FIG. 6 and FIG. 7.

Figure 7:
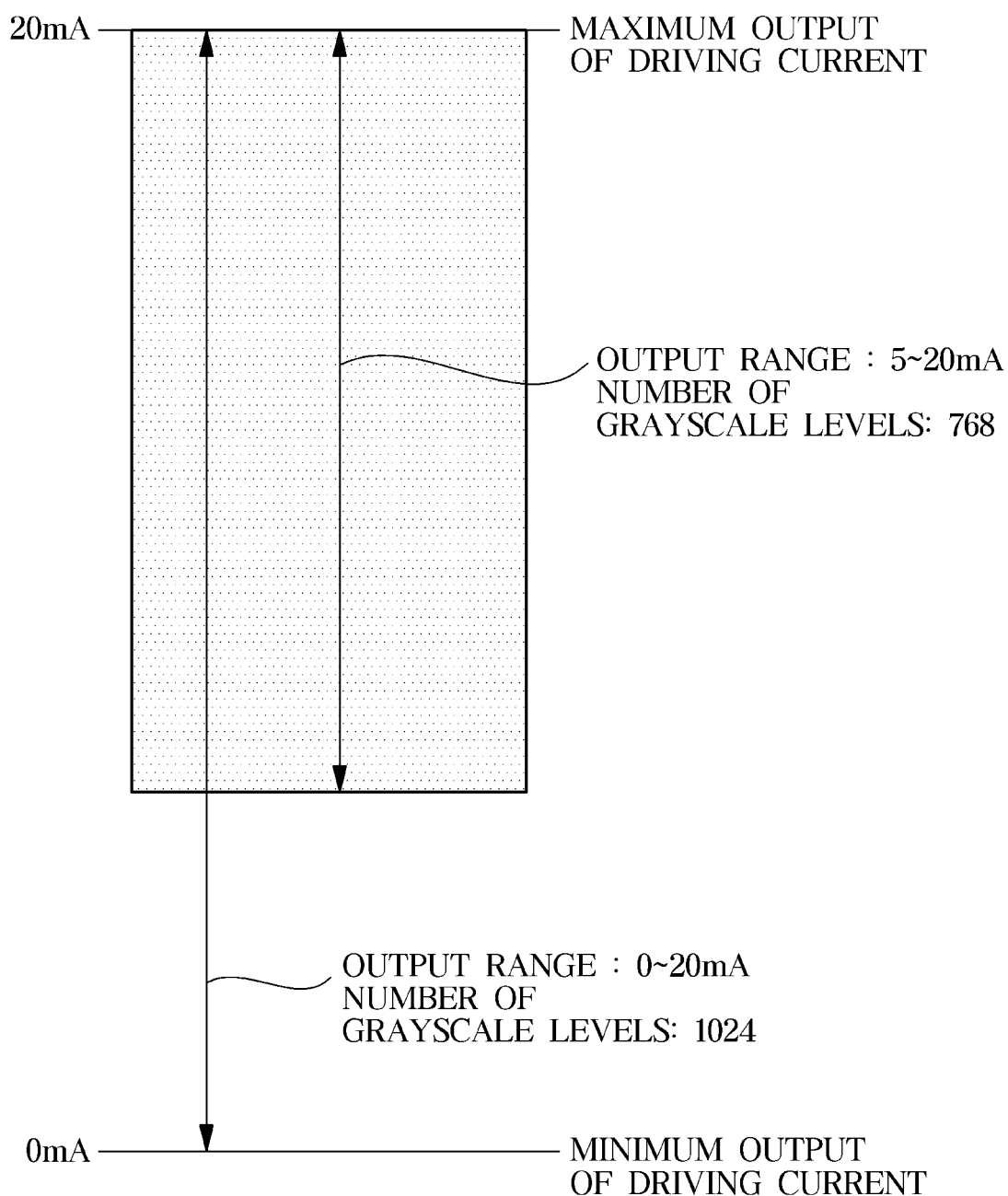

FIG. 6 and FIG. 7 are diagrams illustrating the number of grayscale levels and an output range of a driving current that are limited in a low grayscale or high grayscale.

Referring to FIG. 6, the display device 1 shows the low grayscale mode to reduce power consumption in the first mode and use low luminance. For example, the display device 1 may represent luminance according to the number of grayscale levels divided to gradually express from dark to bright parts. Although the total number of grayscale levels is described as 1024 in the following description, the number is for convenience of description, and various grayscale levels may be applied according to the specifications of the display device 1.

The display device 1 uses only grayscales in a range of 0 to 512 in the total number of grayscale levels for low power consumption in the first mode. A minimum value and a maximum value of a driving current corresponding thereto are 0 mA and 10 mA, respectively, and power consumption at a place where high visibility is not required may be reduced.

Referring to FIG. 7, the display device 1 shows the high grayscale mode to improve visibility in the second mode and use high luminance. The display device 1 uses only grayscales in a range of 257 to 1024 to improve visibility in the second mode. A minimum value and a maximum value of a driving current corresponding thereto are 5 mA and 20 mA, respectively, and visibility in an outdoor space may be improved.

Meanwhile, according to FIG. 6 and FIG. 7, when the display device 1 is operated in either the first mode or the second mode, only a portion of the total number of grayscale levels is used in one of the modes. Accordingly, luminance that may be represented may be limited and expressiveness of the image may be reduced.

According to the disclosure, advantages of both the first mode and the second mode may be maintained, and various luminance may be represented by the low grayscale and high grayscale, and a specific method therefor is described in detail below.

Figure 8:
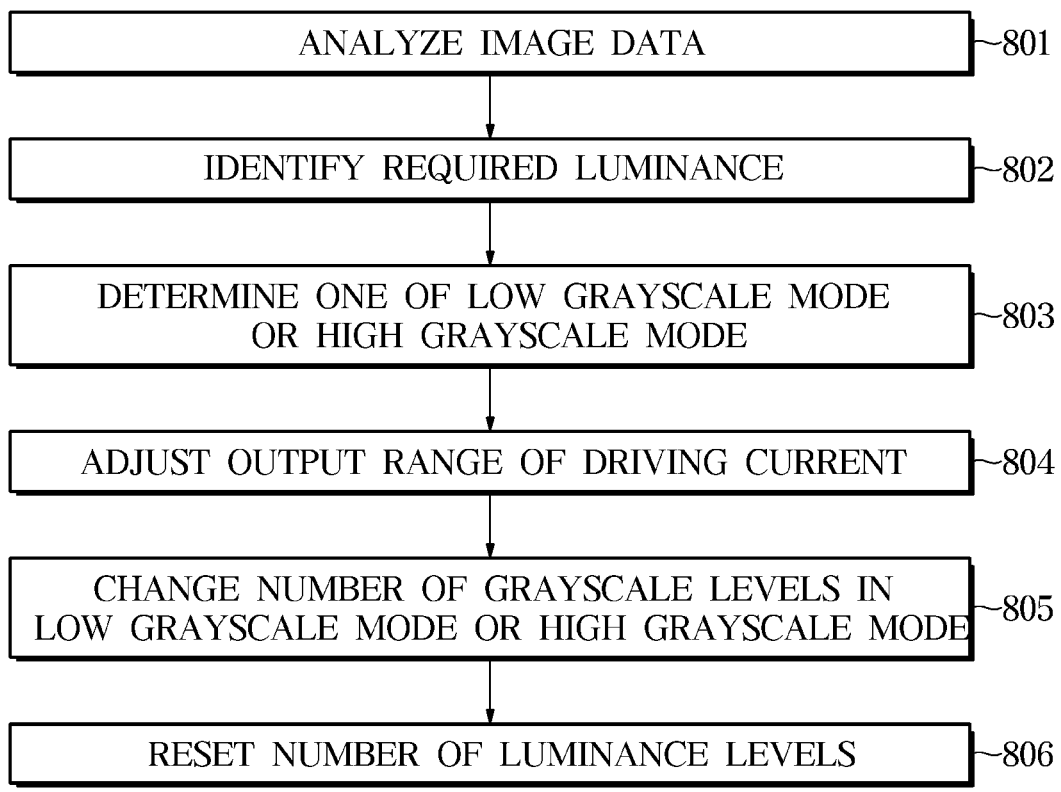
FIG. 8 is a flowchart illustrating a control method of a display device according to an embodiment of the disclosure.
Figure 9:
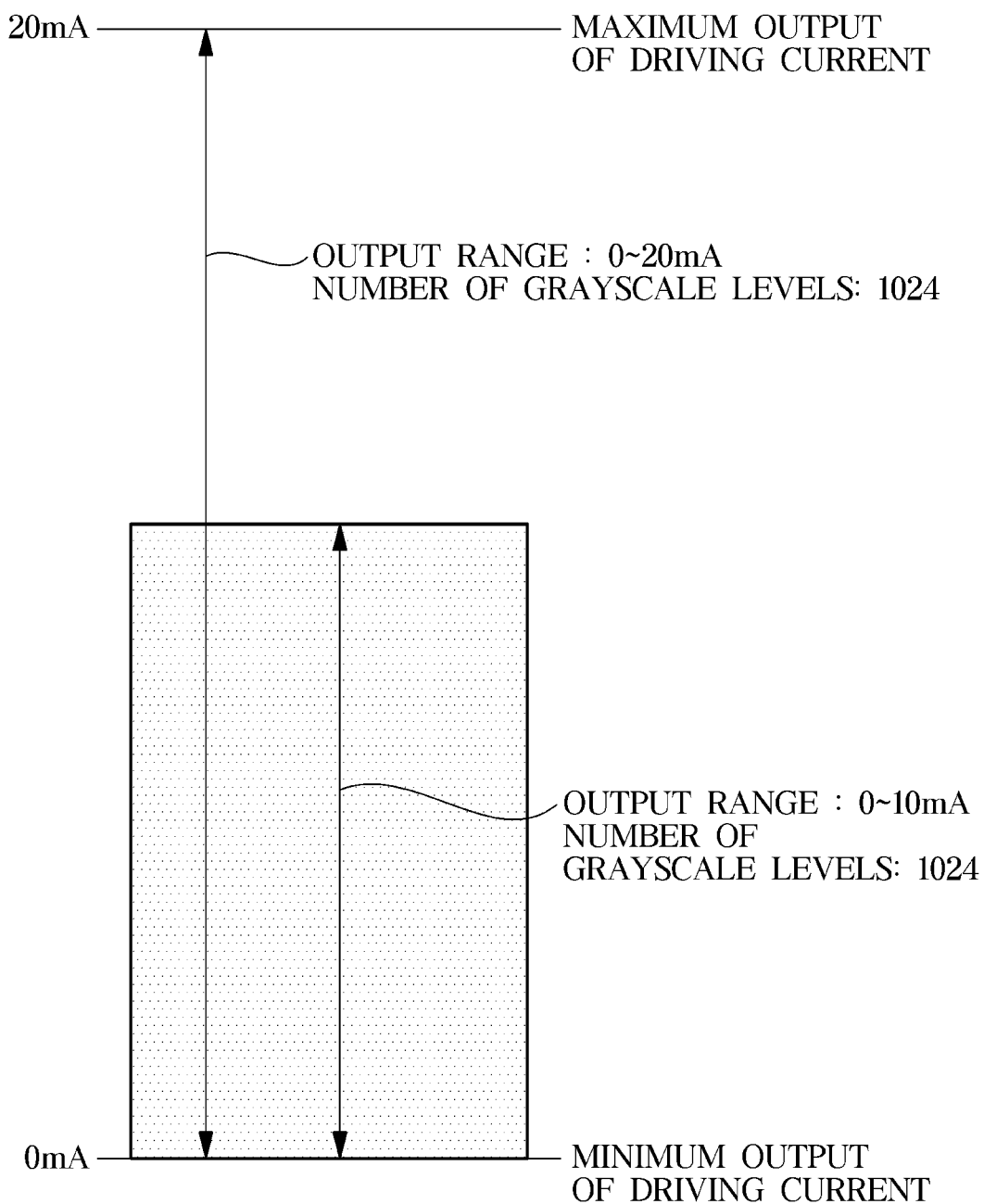
FIG. 9 and FIG. 10 illustrate that the number of grayscale levels and the number of luminance levels in a display device according to an embodiment of the disclosure are increased in a low grayscale mode.
Figure 10:
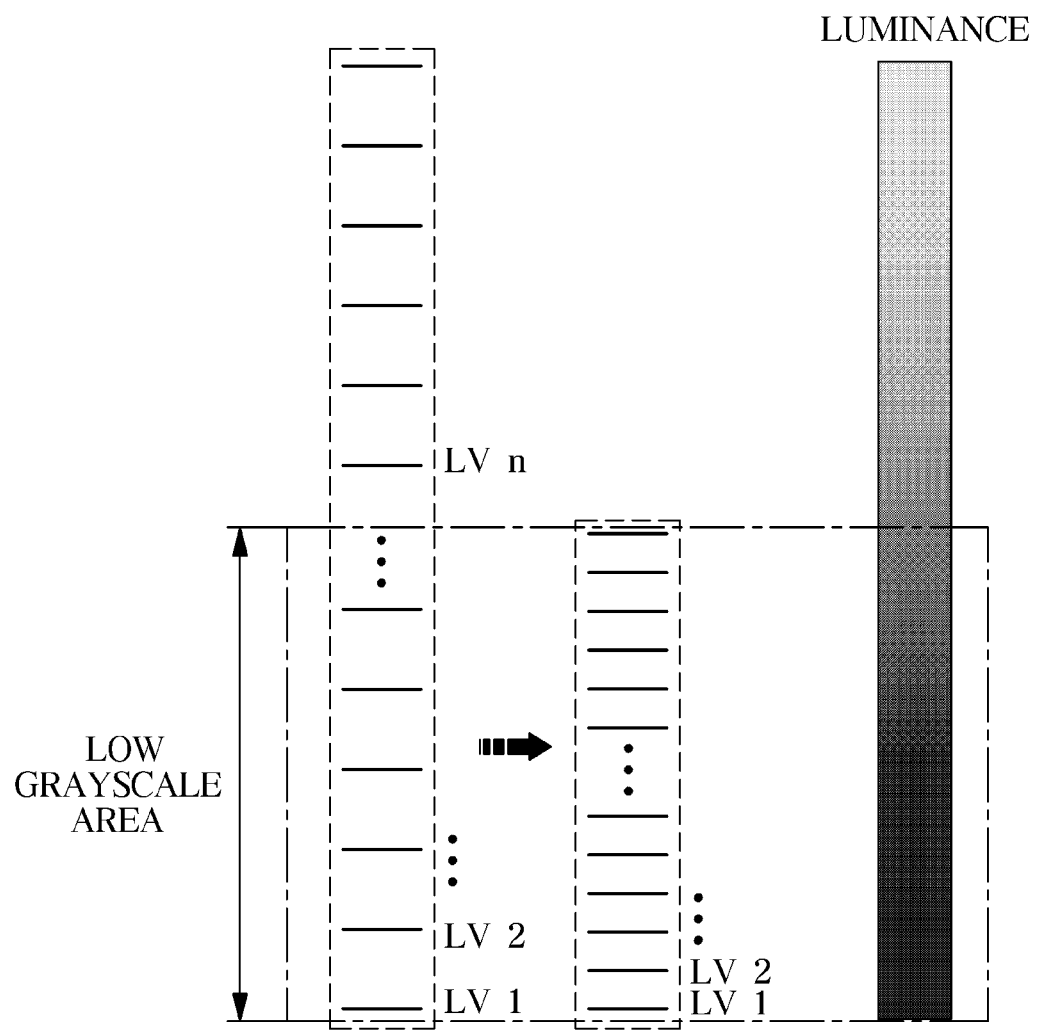
Figure 11:
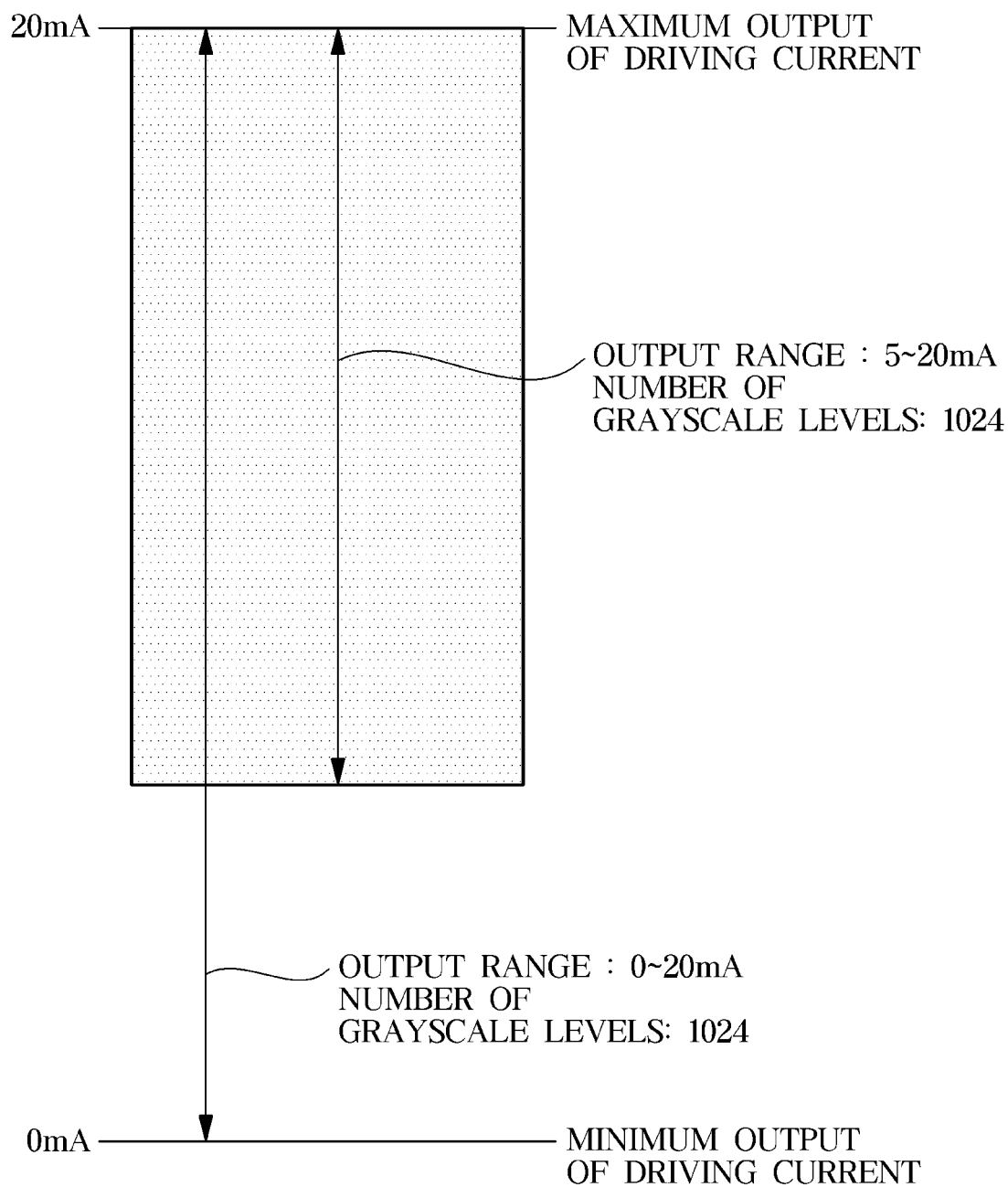
FIG. 11 and FIG. 12 illustrate that the number of grayscale levels and the number of luminance levels in a display device according to an embodiment of the disclosure are increased in a high grayscale mode.
Figure 12:
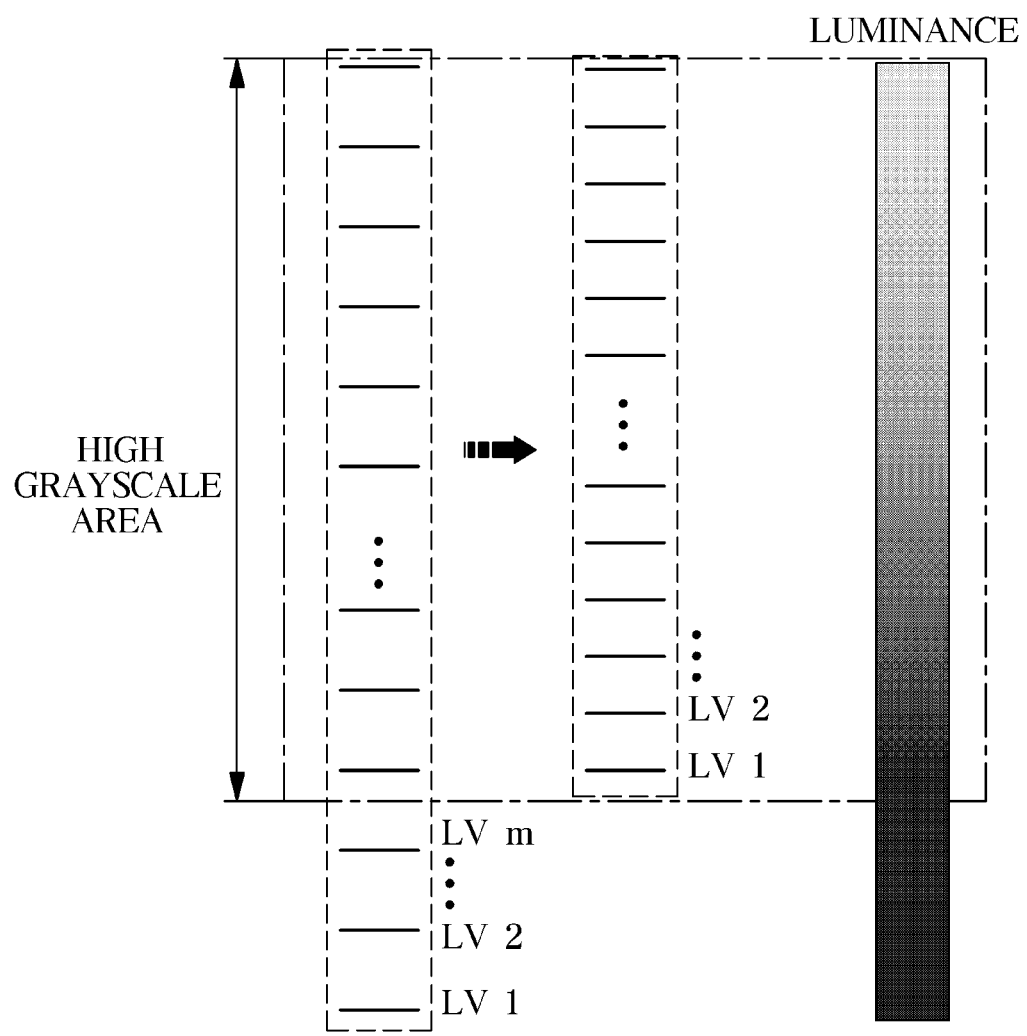

FIG. 8 is a flowchart illustrating a control method of a display device according to an embodiment of the disclosure. FIG. 9 and FIG. 10 illustrate that the number of grayscale levels and the number of luminance levels in a display device according to an embodiment of the disclosure are increased in a low grayscale mode. FIG. 11 and FIG. 12 illustrate that the number of grayscale levels and the number of luminance levels in a display device according to an embodiment of the disclosure are increased in a high grayscale mode.

The display device 1 analyzes image data (801). The display device 1 processes the image data received from the outside and visually displays an image. In this instance, the image data includes luminance data, and allows the display device 1 to identify a required luminance required for each frame or part of the frame (802).

The display device 1 determines one of a low grayscale mode or a high grayscale mode (803). Specifically, the display device 1 may determine either the low grayscale mode or the high grayscale mode depending on whether low luminance or high luminance is required for each frame (or part of a frame). Specifically, the display device 1 may adjust an output range of a driving current in units of frames of image data.

According to an embodiment, the display device 1 may select one of the low grayscale mode or the high grayscale mode based on the required luminance identified through the image data. The display device 1 may determine the output range of the driving current by determining a minimum value and a maximum value of the driving current according to the selected mode. Although the output ranges in FIG. 9 and FIG. 11 are described using specific values as an example, the minimum value and the maximum value of the driving current may be determined based on a minimum value and a maximum value of the required luminance. In other words, the minimum value of the driving current may be obtained based on the minimum value of the required luminance, and the maximum value of the driving current may be obtained based on the maximum value of the required luminance. Each of the minimum value and the maximum value of the required luminance may be determined within a frame or part of a frame.

The display device 1 adjusts the output range of the driving current (804). The display device 1 may receive a luminance value represented by a frame or a part of a frame, and determine the output range corresponding thereto. The display device 1 may determine the minimum value and the maximum value of the driving current required according to the required luminance, and may adjust the output range of the driving current based on the determined minimum and maximum values. Because the output range of the display device 1 is limited, power consumption may be reduced in the low grayscale mode and visibility may be improved in the high grayscale mode.

Referring to FIG. 9 and FIG. 11, as a result of processing the image data, the display device 1 may determine the output range of the driving current to be 0 mA to 10 mA in the low grayscale mode. In addition, as a result of processing the image data, the display device 1 may determine the output range of the driving current to be 5 mA to 20 mA in the high grayscale mode.

The display device 1 changes the number of grayscale levels in the low grayscale mode or the high grayscale mode (805). In this instance, unlike FIG. 6 and FIG. 7, the display device 1 may use an increased number of grayscale levels in order to densely represent luminance in the low grayscale mode or the high grayscale mode. An existing display device uses only a portion of 1024 which is the total number of grayscale levels, as the existing display device enters a low grayscale mode or a high grayscale mode. However, in the embodiment, the number of grayscale levels is increased upon entering a specific mode to use more grayscales than existing display devices.

Referring to FIG. 10, in the low grayscale mode, the display device 1 may use levels LV of all grayscale areas in a low grayscale area. In a low grayscale mode, a grayscale level greater than or equal to n level LVn, which is a relatively high grayscale, was not used. In the embodiment, however, all the number of grayscale levels may be used to provide various luminance in a low luminance area. Accordingly, the display device 1 may represent 1024 luminances within the low luminance area in the low grayscale mode.

Upon entering the low grayscale mode, the display device 1 according to an embodiment may adjust the output range of the driving current and increase the number of grayscale levels that fall within the output range. In response to the low grayscale mode being determined, the display device 1 may increase the number of grayscale levels from a first level to a third level. For example, in the low grayscale mode, the display device 1 may increase the number of grayscale levels from 512 to 1024.

Referring to FIG. 12, in the high grayscale mode, the display device 1 may use levels LV of all grayscale areas in a high grayscale area. In a high grayscale mode, a grayscale level less than or equal to m level LVm, which is a relatively low grayscale, was not used. In the embodiment, however, all the number of grayscale levels may be used to provide various luminance in a high luminance area. Accordingly, the display device 1 may represent 1024 luminances within the high luminance area in the high grayscale mode.

Upon entering the high grayscale mode, the display device 1 according to an embodiment may adjust the output range of the driving current and increase the number of grayscale levels that fall within the output range. In response to the high grayscale mode being determined, the display device 1 may increase the number of grayscale levels from a second level to the third level. For example, in the high grayscale mode, the display device 1 may increase the number of grayscale levels from 768 to 1024.

In the above example, the number of grayscale levels is increased to 1024 in the low grayscale mode and the high grayscale mode. However, the number of grayscale levels may be set to a value lower than the maximum number of grayscale levels depending on the specifications of the display device 1 and an external environment.

The display device 1 resets the number of luminance levels (806). The display device 1 may reset the number of luminance levels according to the number of grayscale levels changed in operation 805. According to an embodiment, the display device 1 may control a luminance of the backlight unit 200 through a PAM control. Due to the increase in the number of luminance levels as the number of grayscale levels increases, the luminance that may be represented in the low grayscale mode or the high grayscale mode increases. Accordingly, the display device 1 may provide more detailed and clearer images compared to existing display devices.

According to an embodiment, the display device 1 may adjust the output range of the driving current based on the image data. By identifying whether an image is low grayscale or high grayscale according to luminance information included in the image data, the output range of the driving current may be reduced. In this instance, the display device 1 may increase the reduced number of luminance levels as the output range is reduced, and may control the driving circuit 234 (FIG. 5) based on the increased number of luminance levels. Due to the increase in the number of luminance levels, the driving circuit 234 may relatively finely control a magnitude of the driving current within the output range to allow the display device 1 to represent various luminance.

According to an embodiment, in response to the output range being adjusted based on the image data, the display device 1 may increase the number of grayscale levels that fall within the output range, and may reset the number of luminance levels based on the increased number of grayscale levels. Although it has been described in the embodiment that the number of grayscale levels is increased, the display device 1 may also set to consistently use the total number of grayscale levels upon entering the low grayscale mode or high grayscale mode.

The above-described embodiment may be applied not only to luminance but also to color depth that determines color.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored. For example, there may be a Read Only Memory (ROM), a Random Access Memory (RAM), a magnetic tape, a magnetic disk, a flash memory, and an optical data storage device.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

Although the disclosure has been shown and described in relation to specific embodiments, it would be appreciated by those skilled in the art that changes and modifications may be made in these embodiments without departing from the principles and scope of the disclosure, the scope of which is defined in the claims and their equivalents.

The invention claimed is:

1. A display device, comprising:
   a display panel;
   a light emitting unit comprising a plurality of light emitting diodes (LEDs), the light emitting unit being configured to be driven in one of a low grayscale mode or a high grayscale mode in which an output range of a driving current is reduced;
   a driving circuit configured to control the driving current applied to the light emitting unit based on image data of a frame; and
   a controller configured to:
      obtain a selected mode of one of the low grayscale mode or the high grayscale mode based on a required luminance included in the image data of the frame, wherein the high grayscale mode is selected for outdoor display;
      obtain a mode minimum value and a mode maximum value of the driving current based on the selected mode,
      wherein the mode minimum value of the low grayscale mode is a minimum value of the output range of the driving current and the mode maximum value of the high grayscale mode is a maximum value of the output range of the driving current,
      wherein the mode maximum value of the driving current in the low grayscale mode is lower than the mode maximum value of the driving current in the high grayscale mode and a maximum driving current output value of the driving circuit, and
      wherein the mode minimum value of the driving current in the high grayscale mode is greater than the mode minimum value of the driving current in the low grayscale mode and a minimum driving current output value of the driving circuit;
      reduce the output range of the driving current to a reduced output range corresponding to the mode minimum value and the mode maximum value of the driving current according to the selected mode;
      increase a number of grayscale levels that fall within the reduced output range;
      increase a number of luminance levels expressible to correspond to the increased number of grayscale levels within the reduced output range to obtain the increased number of luminance levels; and
      control the driving circuit based on the increased number of luminance levels.

2. The display device of claim 1, wherein the controller is configured to:
   obtain the mode minimum value of the driving current based on a minimum value of the required luminance, and
   obtain the mode maximum value of the driving current based on a maximum value of the required luminance.

3. The display device of claim 2, wherein the controller is configured to increase the number of grayscale levels from a first level number to a third level number, in response to the low grayscale mode being the selected mode.

4. The display device of claim 3, wherein the controller is configured to increase the number of grayscale levels from a second level number to the third level number, in response to the high grayscale mode being the selected mode.

5. The display device of claim 2, wherein the controller is configured to:
obtain the mode minimum value of the driving current and the mode maximum value of the driving current based on the required luminance included in the image data, and
obtain the reduced output range based on the mode minimum value of the driving current and the mode maximum value of the driving current.

6. The display device of claim 1, wherein the controller is configured to reduce the output range of the driving current in units of frames of the image data.

7. The display device of claim 1, wherein the controller is configured to control a luminance of the light emitting unit using at least one of a pulse amplitude modulation (PAM) control or a pulse width modulation (PWM) control.

8. A control method of a display device comprising a display panel, a light emitting unit comprising a plurality of light emitting diodes (LEDs), the light emitting unit being configured to be driven in one of a low grayscale mode or a high grayscale mode in which an output range of a driving current is reduced, and a driving circuit configured to control the driving current applied to the light emitting unit based on image data of a frame, the control method comprising:
obtaining a selected mode of one of the low grayscale mode or the high grayscale mode based on a required luminance included in the image data of the frame, wherein the high grayscale mode is selected for outdoor display;
obtaining a mode minimum value and a mode maximum value of the driving current according to the selected mode, wherein the mode minimum value of the low grayscale mode is a minimum value of the output range of the driving current and the mode maximum value of the high grayscale mode is a maximum value of the output range of the driving current, wherein the mode maximum value of the driving current in the low grayscale mode is lower than the mode maximum value of the driving current in the high grayscale mode and a maximum driving current output value of the driving circuit, and wherein the mode minimum value of the driving current in the high grayscale mode is greater than the mode minimum value of the driving current in the low grayscale mode and a minimum driving current output value of the driving circuit;
reducing the output range of the driving current to a reduced output range corresponding to the mode minimum value and the mode maximum value of the driving current according to the selected mode;
increasing a number of grayscale levels that fall within the reduced output range;
increasing a number of luminance levels expressible to correspond to the increased number of grayscale levels within the reduced output range to obtain the increased number of luminance levels; and
controlling the driving circuit based on the increased number of luminance levels.

9. The control method of claim 8, wherein the obtaining of the mode minimum value of the driving current and the mode maximum value of the driving current comprises:
obtaining the mode minimum value of the driving current based on a minimum value of the required luminance, and
obtaining the mode maximum value of the driving current based on a maximum value of the required luminance.

10. The control method of claim 9, wherein the increasing of the number of grayscale levels comprises increasing the number of grayscale levels from a first level number to a third level number, in response to the low grayscale mode being the selected mode.

11. The control method of claim 10, wherein the increasing of the number of grayscale levels comprises increasing the number of grayscale levels from a second level number to the third level number, in response to the high grayscale mode being the selected mode.

12. The control method of claim 9, further comprising:
obtaining the mode minimum value of the driving current and the mode maximum value of the driving current based on the required luminance included in the image data, and
obtaining the reduced output range based on the mode minimum value of the driving current and the mode maximum value of the driving current.

13. The control method of claim 8, wherein the reducing of the output range of the driving current is performed in units of frames of the image data.

14. The control method of claim 8, further comprising:
controlling a luminance of the light emitting unit using at least one of a pulse amplitude modulation (PAM) control or a pulse width modulation (PWM) control.

* * * * *